United States Patent [19]
Teutenberg et al.

[11] Patent Number: 5,754,423
[45] Date of Patent: May 19, 1998

[54] METHOD AND APPARATUS FOR PREPARING A MIXTURE OF MATERIALS

[75] Inventors: Josef Teutenberg, Beckum; Werner Brosowski, Hamm, both of Germany

[73] Assignee: Krupp Polysius AG, Beckum, Germany

[21] Appl. No.: 643,741

[22] Filed: May 6, 1996

[30] Foreign Application Priority Data

May 23, 1995 [DE] Germany ............ 195 18 958.2

[51] Int. Cl.$^6$ .............. G05B 13/02; C04B 2/10
[52] U.S. Cl. .............. 364/148; 364/152; 106/743; 106/757
[58] Field of Search .............. 364/148, 149, 364/152–156, 166; 106/693, 739, 743, 746–751, 756, 758, 771, 772

[56] References Cited

U.S. PATENT DOCUMENTS

| | | | |
|---|---|---|---|
| 3,602,488 | 8/1971 | Romig | 432/55 |
| 4,026,717 | 5/1977 | Harris | 106/743 |
| 4,395,290 | 7/1983 | Oller | 106/743 |
| 4,508,573 | 4/1985 | Harris | 106/752 |
| 4,600,438 | 7/1986 | Harris | 106/757 |
| 4,799,880 | 1/1989 | McCoy | 432/45 |
| 4,910,684 | 3/1990 | Ostergard et al. | 364/503 |
| 5,527,387 | 6/1996 | Andersen et al. | 106/693 |

*Primary Examiner*—Reba I. Elmore
*Assistant Examiner*—Thomas E. Brown
*Attorney, Agent, or Firm*—Learman & McCulloch

[57] ABSTRACT

The invention relates to the preparation of a material mixture consisting of a plurality of mineral raw material components which are delivered individually proportioned, are ground and homogenised, wherein samples are periodically analysed and determined ACTUAL values are compared with predetermined DESIRED values in order if appropriate to carry out corrective control interventions on the proportioning of raw material components by way of a laboratory computer. In relatively short time periods evaluations of the material samples and re-homogenisation of the ground mixture can be carried out very reliably with relatively low expenditure on construction if the material samples are analysed on the spot by means of a rapid analysis arrangement and the determined ACTUAL values from this analysis are passed to the laboratory computer, the homogenisation being carried out in a mixing zone with relatively small receiving capacity which is separated from the storage zone.

20 Claims, 2 Drawing Sheets

METHOD AND APPARATUS FOR PREPARING A MIXTURE OF MATERIALS

The invention relates to a method and to apparatus for preparing a mixture of materials from a plurality of mineral raw material components, particularly a raw meal mixture for burning of cement clinker.

BACKGROUND OF THE INVENTION

If, for example, a burning arrangement or kiln installation for the production of cement clinker is to be operated uniformly and with optimum throughput, then it is an important prerequisite that a raw material mixture or raw meal mixture should be delivered with predetermined and constant quality to the burning arrangement. The raw material mixture to be produced can be rendered uniform by corresponding mixing of different mineral raw material components for example in a mixing bed or also immediately before a raw mill system, before which the individual raw material components are brought together and in which these combined raw material components are jointly ground. However, the individual raw material components are not always constant in their composition, so that continuous monitoring and adjustment of the components of the mixture is necessary. For this purpose it is already known to use so-called laboratory automation systems which operate fully automatically and which ensure monitoring and any necessary adjustment of the proportioning of the components.

Thus it is already known for the mass flows of the individual mineral raw material components which form the combined raw mill feed, and from which the mixture of materials which is to be prepared is produced by mixing them together, to be controlled by such a laboratory automation system by way of a central control arrangement with the aid of suitable proportioning devices using raw material analysis data. For this purpose material samples are removed from the comminuted material periodically at specific time intervals with the aid of an automatic material sampling station, for example at the outlet of a raw mill. Hitherto it has seemed in practice that the time taken to remove a sample can for instance extend to more than half an hour, whereupon the material samples obtained are collected and mixed and a representative material sample therefrom is transported by way of a pneumatic tube conveyor system to a central laboratory for analysis and is analysed there with the aid of a fully automatic preparation arrangement. The current ACTUAL values of the ground material composition with regard to oxides, lime standard (LS), silica modulus (SM) and alumina modulus (AM) are calculated by way of this analysis. These calculated ACTUAL values are compared with predetermined DESIRED values for LS, SM, AM etc., whereupon if any deviations are established between the ACTUAL and DESIRED values a control intervention is carried out by way of a laboratory computer of a control system or a control arrangement for corresponding correction of the proportioning of at least one of the raw material components by appropriate adjustment on-line of the proportioning devices of storage cells for the individual raw material components.

It will be clear from the preceding explanations that fluctuations in quality within the raw material compositions cannot be detected and stabilised within a sampling cycle of <30 minutes, so that a correspondingly extensive re-homogenisation of the ground raw material mixture is necessary. In the case of relatively large continuous blending silos, such as are frequently used for the homogenisation or re-homogensation of raw meal mixtures for the production of cement clinker, it is not possible to homogenise a defined material mass, but rather a fictitious silo volume often of several thousand tonnes must be expected. Such homogenising silos require not only a relatively large volume but also account must be taken of the fact that such raw material mixtures tend to separate into the individual grain fractions because of their differing chemism, i.e. for example cement raw meal separates during filling of a large homogenising silo and also cannot be sufficiently (specifically) remixed in known continuous blending silos. Consequently, in the production of cement clinker the raw meal mixture cannot be fed with the desired predetermined and constant quality to the burning arrangement or burning installation.

The object of the invention, therefore, is to make further developments to a method as well as apparatus in such a way that, on the one hand, even in the event of sharp fluctuations in the chemical composition at least of the principal raw material components material samples can be evaluated in relatively short time periods and thereupon any necessary corrective control interventions can be carried out for the raw material compositions and, on the other hand, re-homogenisation of the ground raw material mixture can be carried out very reliably with relatively low expenditure on construction.

SUMMARY OF THE INVENTION

By the use of the method according to the invention the material mixture to be prepared from the different mineral raw material components can be specifically brought to the predetermined DESIRED values and held there and after grinding can be equally specifically homogenised or re-homogenised in that:

a) the analysis is carried out automatically on the spot with the aid of a rapid analysis arrangement, b) the ACTUAL values from this analysis are fed to the laboratory computer for comparison with the DESIRED values, and c) the homogenisation (re-homogenisation) of the raw material mixture is carried out in a separate mixing zone which receives a quantity of material equivalent to at least an hourly grinding capacity (t/h) of the comminuting arrangement and from which the material mixture can be delivered on the one hand to a further processing arrangement (e.g burning arrangement in the production of cement clinker) and on the other hand to a separate storage zone, in each case in adjustable proportions by quantity.

Thus according to the invention by means of the automatic rapid analysis on the spot material samples can be taken in relatively short time periods from the mass flow coming from the comminuting arrangement and can be analysed as regards their ACTUAL values for the oxides and the various predetermined moduli (lime standard, silica modulus and alumina modulus). Because of the short distance between a sampling point and the rapid analysis arrangement this can also take place with relatively low expenditure on construction. The measured ACTUAL values can then be delivered quickly and by way of simple signal lines to the laboratory computer in order to compare them there with the predetermined DESIRED values for the said moduli. When a deviation of the ACTUAL values from the DESIRED values is established, a corresponding control intervention for correction of the proportioning of at least one of the various raw material components can then be carried out by way of the control system with which the laboratory computer is associated.

Although in general the laboratory computer associated with the control system could likewise be disposed on the spot, i.e. directly in the rapid analysis arrangement, it is generally preferred to dispose the laboratory computer in the central laboratory so that the ACTUAL values of the analysis can then accordingly be fed to a central laboratory computer, which is advantageous particularly in the case of apparatus parts which are very prone to collect dust.

Despite the possibility described above of acting relatively quickly to correct any alterations in the chemical composition of the individual raw materials with a view to constant quality of the raw material composition to be produced, in this method according to the invention it is also necessary for various reasons to carry out a re-homogenisation of the ground raw material mixture. However, since—as previously mentioned—action can be taken very quickly to correct any fluctuations in the composition of the raw material components, according to the invention—by comparison with the known methods—only a relatively small capacity is necessary for this re-homogenisation. In this case it is particularly favourable that according to the invention this homogenisation is divided into a separate mixing zone and a separate storage zone, wherein the mixing zone only needs to be designed for at least an hourly grinding capacity of the comminuting arrangement in order to ensure a reliable re-homogenisation of the ground raw material mixture. Therefore this mixing zone of relatively small design can be established with relatively low expenditure on construction. The storage zone which is separated therefrom is intended above all for stocking or intermediate storage of the already homogenised material mixture between the mixing zone and the further processing arrangement, that is to say for example a burning plant for producing cement clinker, so that it only needs to be equipped with relatively simple outlet fittings etc. This storage zone must be designed so that its capacity is for instance so great that it has a sufficiently large storage volume in order for example to be able to bridge any possible (desired or undesired) shutdown periods of the comminuting arrangement, without the further processing arrangement (e.g. burning plant) also having to be shut down as a result.

In this method according to the invention the entire mass flow of the raw material mixture ground in the comminuting arrangement is conveyed into the mixing zone and is sufficiently homogenised there. Then—when the comminution arrangement is operating—from this mixing zone the material mixture is conveyed on the one hand, and preferably in a large main quantity, to a further processing arrangement (e.g. a burning arrangement or burning plant for producing cement clinker) and on the other hand, and preferably in a smaller part-quantity, to the separate storage zone in each case in adjustable proportions by quantity, so that on the one hand the further processing arrangement and on the other hand—simultaneously—the storage zone can be continuously supplied from the storage zone. Thus in this way a further blending of material mixtures prepared at different time periods can be simultaneously ensured.

Thus due to this method according to the invention a sensible combination is also to some extent created between a control by way of a laboratory automation system for the individual raw material components and a specific mixing technique for the re-homogenisation and separate stocking of the prepared material mixture.

With the aid of a rapid analysis arrangement, in which the removed material samples are preferably prepared on the spot and an X-ray fluorescence analysis is carried out, the central laboratory computer can already receive the results or signals of the measured ACTUAL values after an analysis time of approximately 3 minutes in order immediately thereafter to bring about any control interventions which may become necessary for an alteration in the proportioning of the raw material components. Such on the spot preparation and rapid analysis of samples make possible control cycles of approximately 5 to 10 minutes (in comparison with approximately 30 minutes in the known construction described above).

In general it is possible for the material samples to be taken automatically in the region between the comminuting arrangement and the mixing zone (preferably just behind the comminuting arrangement) and additionally as required after leaving the mixing zone and to be delivered to the rapid analysis arrangement located immediately in the proximity of these sections or sampling stations.

According to the invention at least four representative material samples are taken each hour and are analysed on the spot for the particular ACTUAL values of their oxides as well as their various moduli (LS, SM, AM). However, in many cases it will be particularly favourable and advantageous to undertake more frequent material samples and analyses, for example every 10 minutes, in order as a result to be able to react very quickly using control techniques to any alterations which may occur in the composition of individual raw material components, so that a predetermined and constant quality of the material mixture to be prepared can always be guaranteed.

According to an advantageous embodiment of the invention the delivery of the individual raw material components to the comminuting arrangement is in each case proportioned by itself by weight (for example with the aid of proportioning belt scales), and this proportioning is set or adjusted directly, i.e. on-line, by way of the central laboratory computer of the control system at least for the purpose of a necessary correction of the DESIRED values of the predetermined moduli.

The apparatus for preparing a mixture of materials consisting of plurality of mineral raw material components, particularly a raw meal mixture for burning cement clinker, comprises the apparatus features a) to f) according to the preamble to claim 13 and is characterised by the following further features:

g) The analysis arrangement is disposed on the spot in the region of the material sampling station and formed by a rapid analysis device for an automatic sample preparation and X-ray fluorescence analysis and is in signal connection with the—preferably central—laboratory computer;

h) The homogenising section is divided into a mixing zone and a storage zone, and there is disposed after the mixing zone an adjustable distribution device which is connected on the one hand by way of a first conveying path to a further processing arrangement and on the other hand by way of a second conveying path to the storage zone, whilst the storage zone communicates at least with the further processing arrangement by way of an adjustable proportioning device.

The mixing zone is formed in an advantageous manner by a mixing vessel or mixing silo, the raw material receiving capacity of which is adapted approximately to the grinding capacity (in t/h) one to three times per hour of the raw mill, whilst the storage capacity of the storage zone—which is preferably constructed approximately in the form of a continuous silo—corresponds to a predetermined stock quantity which is determined at least by possible shutdown times of the raw mill, a necessary availability for a fixed time of the burning arrangement or the like.

These and further details of the invention are explained in greater detail below with reference to some embodiments which are illustrated in the drawings, in which:

THE DRAWINGS

DETAILED DESCRIPTION

Figure 1:
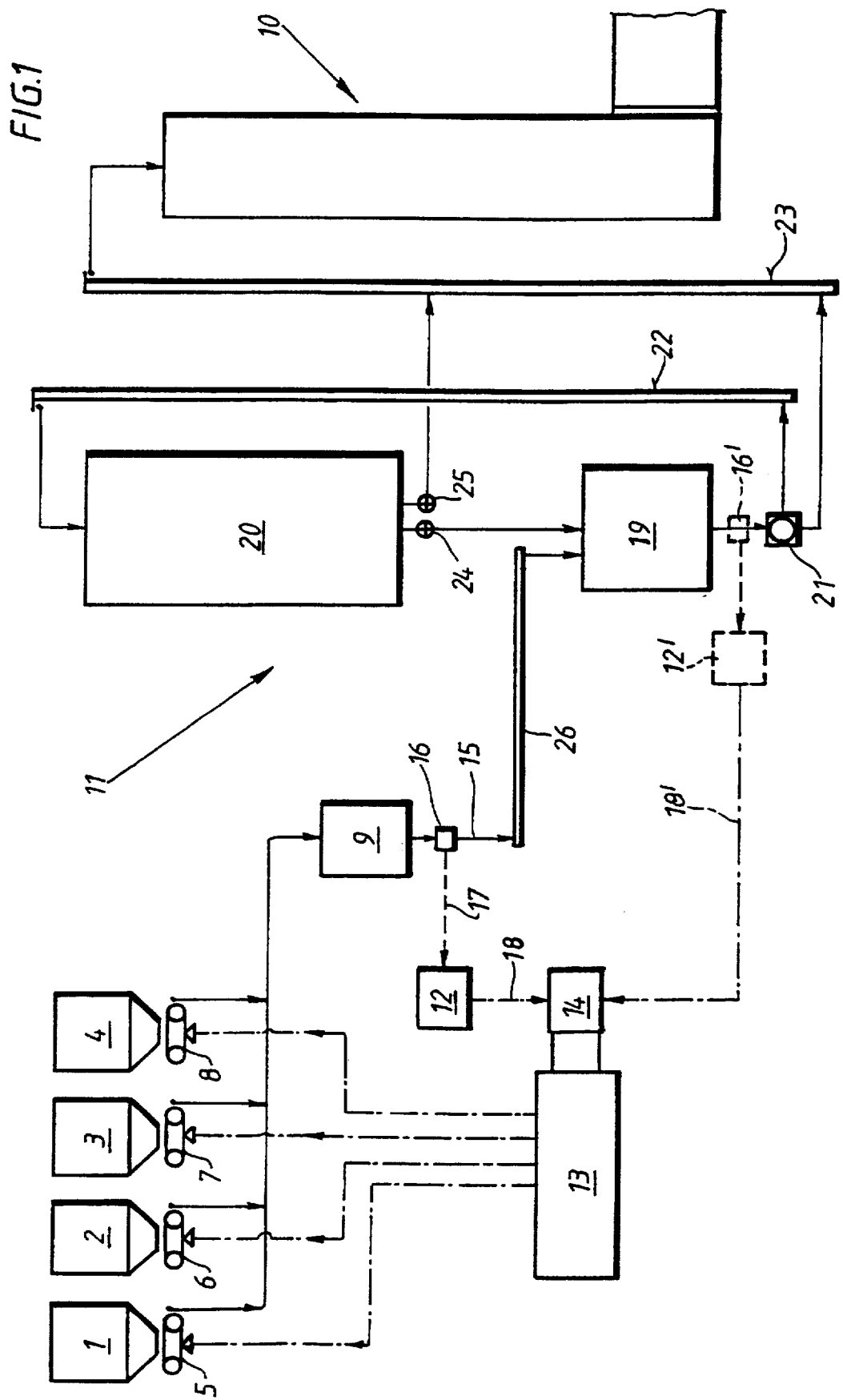
FIG. 1 shows a schematic representation (flow diagram) of a first embodiment of the apparatus according to the invention for preparing a mineral material mixture, particularly a cement raw meal mixture.

In the first embodiment of the apparatus for preparing a raw material mixture it may be assumed that it is constructed in particular for preparing a (cement) raw meal mixture for burning of cement clinker. However, it should already be noted at this point that such apparatus is also suitable for preparing other mineral material mixtures consisting of various raw material components, in which case it is likewise required to set and maintain specific DESIRED values with regard to the chemical composition in the material mixture which is obtained.

The preparation apparatus illustrated in FIG. 1 comprises as essential apparatus parts a plurality of (in the present example four) raw material storage cells 1 to 4, with a remote-controlled proportioning device for example in the form of a proportioning belt scale 5, 6, 7, 8 respectively disposed below each of these storage cells, and a comminuting arrangement with at least one raw mill 9, a homogenising section 11 disposed between this raw mill 9 and a burning plant or burning arrangement 10 which serves as a further processing arrangement, at least one analysing arrangement 12 for material samples as well as a central control arrangement 13 with which is associated a laboratory computer 14 connected to the analysis arrangement 12. Particularly in zones of the apparatus which are very prone to collect dust, it is preferred to instal this laboratory computer 14 centrally, i.e. in the central laboratory.

The various raw material storage cells 1, 2, 3, 4 can each receive the individual raw material components which for the production of a cement raw meal mixture can in particular be limestone, marl, silicate and iron oxide as well as, if appropriate, other components and correcting agents. With the aid of the proportioning belt scales 5 to 8 the individual raw material components can be proportioned according to their chemical compositions in predetermined proportions by weight or by quantity and can be jointly fed as a raw material combination to the raw mill 9, which can preferably be a roll grinding mill but, if appropriate, also a roller mill. In this raw mill 9 the raw material components which can be delivered in adjustable quantities are jointly comminuted or ground to a predetermined fineness.

The proportioning belt scales 5 to 8 are in control connection with the control arrangement 13 by way of control lines indicated by dash-dot lines, so that at any time they can be controlled individually for the purpose of a correction to the proportioning in order in particular to set or maintain predetermined moduli with regard to the chemical composition of the material mixture to be prepared or of the raw meal to be prepared. For this purpose there is provided in the outlet chute or discharge duct 15 of the raw mill 9 a material sampling station 16 by which material samples are taken periodically at adjustable time intervals from the material stream running off from the raw mill 9 and these samples are supplied by way of a short sample duct 17, indicated by broken lines, to the analysis arrangement 12 which is disposed quite close by, that is to say on the spot.

This analysis arrangement disposed on the spot close to the material sampling station 16 is formed according to the invention by a rapid analysis device 12 for an automatic sample preparation and X-ray fluorescence analysis. In this way samples can be taken from ground material stream on the spot and in relatively short time intervals and can be immediately analysed with regard to their chemical composition, in particular with regard to their oxides and their moduli referred to above (LS, SM and AM). Whilst the used samples can be returned directly into the discharge duct 15, the ACTUAL value for the oxides and the moduli determined in the rapid analysis device 12 are immediately transmitted to the central laboratory computer 14. With the aid of this central laboratory computer 14 the ACTUAL values which are in each case newly determined for the oxides and the mineral moduli are compared with the DESIRED values predetermined therefor. If this comparison which can be carried out quickly in a short time establishes a deviation of the current ACTUAL values from the predetermined DESIRED values, then by way of the control arrangement 13 to which the central laboratory computer 14 belongs a corresponding control intervention is immediately undertaken in order to carry out a correction of the proportioning of at least some raw material components by corresponding control of the appertaining proportioning belt scale 5, 6, 7 or 8 (several thereof, if appropriate) for the purpose of a calculated correction.

By such rapid analyses on the spot and by the subsequent computer and control activities relatively frequent monitoring and correction interventions are possible in the preparation of material mixtures or raw meal mixtures in relatively short control cycles, for example of 5 to 10 minutes. In this way the production of a predetermined and constant quality of the raw meal mixture to be prepared can be ensured, i.e. a relatively homogeneous raw meal is produced, so that in comparison with the known constructions explained in the introduction much less mixing work or smaller mixing volumes are necessary. Accordingly, in an extremely advantageous way in this preparation plant the homogenising section 11 can be divided into a mixing zone and a storage zone each having a relatively low receiving capacity.

The mixing zone is preferably formed by a mixing silo or mixing vessel 19 which can be constructed in a known manner and in which the receiving capacity is adapted according to the operating conditions to approximately the grinding capacity (t/h) of the raw mill 9 occurring once to three times an hour. The storage zone can be formed by a storage silo 20, preferably approximately in the form of a continuous silo which is known per se; its storage capacity merely needs to correspond to a necessary and accordingly predetermined stock quantity which is determined at least by possible shutdown times of the raw mill 9, a necessary availability for a fixed time of the burning arrangement 10 and possibly by a desired additional stock volume.

An adjustable distributing device, preferably a quantity distributing device 21, which is connected to the one hand by way of a first conveying path to the burning arrangement (further processing arrangement) 10 and on the other hand by way of a second conveying path the inlet of the storage silo 20, is advantageously disposed after the mixing vessel 19, i.e. the outlet thereof. In the embodiment according to FIG. 1 the mixing vessel 19 is disposed below the storage silo, the first conveying path as principal conveying arrangement being constructed as as a first bucket elevator 23 and the second conveying path being principally formed by a second bucket elevator 22, and chutes, conveying ducts or the like can also be provided as connecting arrangements.

In this embodiment of the apparatus (FIG. 1) the storage silo 20 has in its outlet zone two adjustable proportioning devices (e.g. proportioning rotary gate valves or the like) 24, 25, so that depending upon the requirement an adjustable proportion by quantity can likewise be returned from the storage silo 20—by way of the second bucket elevator 22—to the burning arrangement 10 and/or an equally adjustable part-quantity can be returned (by way of the proportioning device 24) to the mixing vessel 19.

The conveying connections described above (on the one hand from the mixing vessel 19 to the burning arrangement 10 and on the other hand as required from the storage silo to the burning arrangement 10 and/or to the mixing vessel 19) advantageously provide further possibilities for blending the raw meal mixture homogenised in the mixing vessel 19 with smaller quantities from the storage silo 20. Moreover, in the case of a—desired or undesired—shutdown of the raw mill 9, from the storage silo 20 the raw meal mixture can be conveyed directly to the burning arrangement 10 or by way of the mixing vessel 19 to the burning arrangement 10 or also, in adjustable quantities, some can be conveyed directly to the burning arrangement 10 and some by way of the mixing vessel 19 to the burning arrangement 10. In each case, however, the total raw material mass flow from the raw mill 9 is conveyed directly into the mixing vessel 19.

With regard to this example of apparatus according to FIG. 1, above all the following possible procedures or modes of operation are also available:

The apparatus can be operated in so-called interconnected operation, in which the raw mill 9 is running. In this case a principal quantity (e.g. 70 to 130% based on the mass flow conveyed from the raw mill 9) of the homogenised mass flow from the mixing vessel 19—a quantity which can be adjusted by means of the distributing device 21—is continuously delivered from the mixing vessel 19 to the burning arrangement 10 for burning of cement clinker and a smaller part-quantity of this mass flow (for example approximately 10 to 30%)—likewise adjustable by means of the distributing device 21—is delivered to the storage silo 20. Simultaneously a small part-quantity (for example approximately 10 to 30% of the mass flow)—adjustable by means of the proportioning device 24 and/or 25—is advantageously delivered to the burning arrangement 10 and/or to the mixing vessel 19. This ensures that the flow behaviour in the storage silo 20 is maintained, that the storage silo 20 is constantly filled and that by blending of raw meals which have been produced or prepared at different times the homogeneity of the raw meal is further improved.

Operating mode in so-called direct operation, in which the raw mill 9 is shut down—as desired or not. In this direct operation the greatest proportion or an adjustable principal quantity (for example approximately 70 to 100%) of the mass flow or of the raw meal mixture is taken out of the storage silo 20 by way of the mixing vessel 19 and blended with a smaller adjustable part-quantity (for example approximately 10 to 30%) of the raw meal mixture which is extracted directly from the storage silo 20 and delivered to the burning arrangement 10. Thus it is also possible in direct operation to achieve a further improvement in the homogeneity by blending meals which have been produced at different times.

In the first filling of the storage silo 20 or after a kiln shutdown without stock remaining it may further be advantageous to convey the entire mass flow from the raw mill 9 either by way of the mixing vessel 19 or directly—by way of the corresponding bucket elevator—into the storage silo 20 in order to be able to fill up the latter particularly quickly.

Advantageously a predetermined storage quantity of the raw meal mixture is always maintained in the storage silo 20.

As can also be seen in FIG. 1, a conveyor arrangement which conveys substantially horizontally, preferably in the form of a pneumatic conveyor trough 26, can also be provided if required between the discharge duct 15 (below the raw mill 9) and the upper inlet of the mixing vessel 19. There is also the possibility—as is partially indicated by broken lines—of additionally providing a further material sampling station 16' with associated analysis arrangement 12' below the outlet of the mixing vessel 19, this sampling station for its part being likewise in signal connection with the central laboratory computer 14 by way of a further signal line 18'. In this way an additional possibility is created for monitoring the chemical composition of the mixture of material or raw meal. Also in this case the material samples are taken automatically and delivered to the rapid analysis arrangement 12' located directly on the spot.

Figure 2:
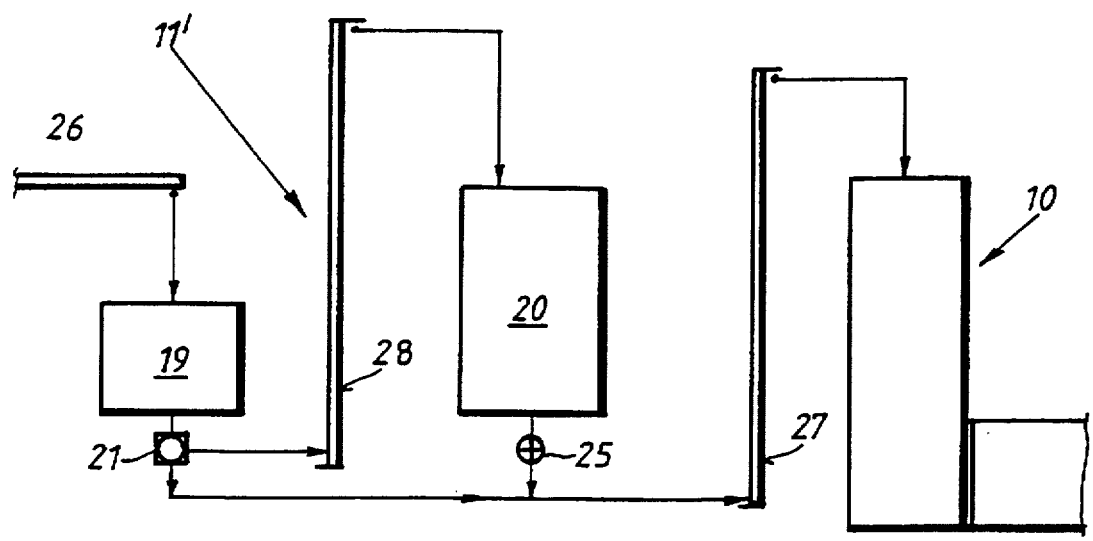
FIG. 2 shows a partial schematic representation for explanation of a second embodiment of the preparation apparatus, wherein the mixing zone and storage zone are disposed alongside one another in the homogenising section.
Figure 3:
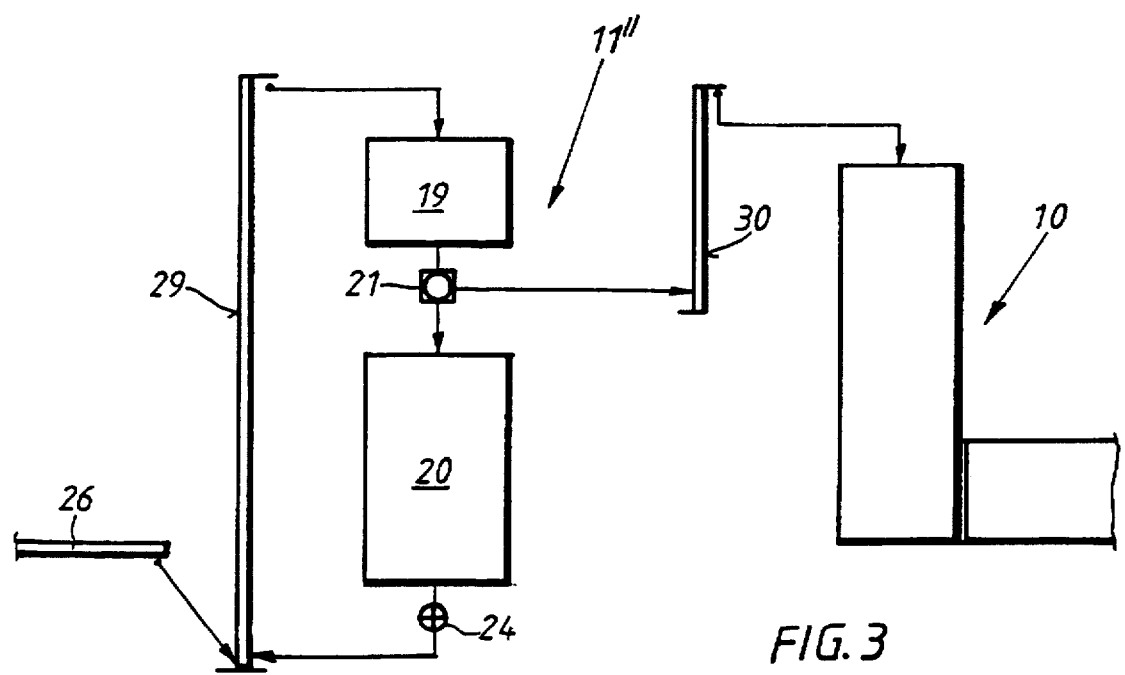
FIG. 3 shows a partial schematic representation for explanation of another embodiment of the preparation apparatus, wherein the mixing zone is disposed above the storage zone.

In FIGS. 2 and 3 further embodiments of the preparation apparatus according to the invention are illustrated in partial schematic representations, i.e. these relate in particular to two variants of the homogenising section 11 in the example according to FIG. 1.

FIG. 2 shows a possible construction in which the homogenising section 11' of the mixing vessel 19 forming the mixing zone is disposed spatially adjacent to the storage silo 20 forming the storage zone. As regards their general construction, their operation and their receiving capacity the mixing vessel 19 and the storage silo 20 can be substantially similar to the design explained in greater detail with reference to FIG. 1. In this embodiment only one proportioning device 25 is co-ordinated with the outlet—not shown in detail here—of the storage silo 20. The storage silo 20 is only directly connected to the burning arrangement 10 by way of this proportioning device 25 and a conveyor arrangement which is formed above all by a bucket elevator 27. On the other hand, a quantity distributing device 21 is again—as in FIG. 1—co-ordinated with the outlet of the mixing vessel 19, so that—in a similar manner to the first embodiment (FIG. 1)—on the one hand an adjustable part-quantity, preferably an adjustable principal quantity of the homogenised mass flow can be delivered—preferably likewise by way of the bucket elevator 27—directly to the burning arrangement 10, and a second adjustable part-quantity, preferably a smaller part-quantity or residual part-quantity, can be delivered by way of a second bucket elevator 28 to the storage silo 20.

If in the case of FIG. 2 we again consider the procedure in the case of interconnected operation (raw mill running), then a principal quantity of the raw meal mixture to be delivered to the burning arrangement 10 is conveyed directly from the mixing vessel 19 and a smaller, likewise adjustable part-quantity is likewise conveyed directly from the storage silo 20, without it being possible for the smaller part-quantity from the storage silo 20 still to be passed via the mixing vessel 19.

In direct operation of the apparatus (raw mill stationary) the raw meal mixtures produced at different times cannot be blended again, since the total quantity of the raw meal mixture required by the burning arrangement 10 is then only conveyed directly from the storage silo 20.

A particular advantage of the construction according to FIG. 2 is to be seen above all in the saving on the overall height.

According to the embodiment in FIG. 3, there is also the possibility of constructing the homogenising section 11' so that the mixing vessel 19 which forms the mixing zone is disposed above the storage silo 20 which forms the storage zone. With regard to their general construction, their operation and their receiving capacity, the mixing vessel 19 and the storage silo 20 can again be designed in a similar manner to the first embodiment (FIG. 1).

In this third embodiment (FIG. 3) a first elevator, particularly a first bucket elevator or a mill bucket elevator 29 for supplying the mixing vessel 19 is provided between the raw mill 9 (not shown, but disposed in a similar manner to FIG. 1) and the mixing vessel 19, and a second bucket elevator or kiln bucket elevator 30 for supplying the burning arrangement 10 is provided in the conveying zone behind the mixing vessel 19. In the conveying zone between the mixing vessel 19 and the storage silo 20 located below it a quantity distributing device 21 is again provided in such a way that an adjustable principal quantity of the homogenised mass flow of the raw meal mixture can be delivered—by way of the kiln bucket elevator 30—to the burning arrangement 10 and a smaller, likewise adjustable part-quantity or residual quantity of this homogenised mass flow can be introduced into the storage silo 20. In this case only one adjustable proportioning device 24 is provided below the storage silo 20 so that a part-quantity, for example in the range from 10 to 100% of the mass flow of the raw meal mixture, can be conveyed back by way of a connecting conveyor only to the mixing vessel 19; advantageously the first elevator or the mill bucket elevator 29 simultaneously serves here as the connecting conveyor.

According to FIG. 3 the raw material ground in the raw mill is conveyed as a whole by way of the pneumatic conveyor trough 26 and the mill bucket elevator 29 into the mixing vessel 19. The burning arrangement 10 is only supplied from the mixing vessel 19 by way of the kiln bucket elevator 30. Since in this case the mixing vessel 19 lies above the storage silo 20, the kiln bucket elevator 30 can be of correspondingly shorter construction. If in this third embodiment direct operation must be employed (raw mill stationary), then the raw meal mixture is delivered from the storage silo 20 only by way of the mill bucket elevator 29 and the mixing vessel 19 as well as the kiln bucket elevator 30 to the burning arrangement 10.

In conclusion, a few principal features of the method according to the invention or the apparatus according to the invention may be outlined again :

Extremely advantageous combination between automatic laboratory equipment for putting together the raw material mixture from various individual components, on the one hand, and a compact specifically controllable mixing or homogenising technique, on the other hand;

quick control cycles due to preparation and analysis of the material samples on the spot, resulting in a more homogeneous material mixture and less mixing work or smaller mixing volume;

the material mixture can be specifically brought to and held at predetermined DISIRED values, since the mixing and storage zones are separated;

a quick and specific homogenisation of the material mixture, since due to the relatively small size of the mixing zone the entire volume thereof participates in the mixing operation;

further improvement in the homogeneity by blending of material mixtures produced at different times;

saving of construction or capital costs;

reduction in the effect of a separation of the material mixture in the storage zone by small flows of quantities of material;

possible blending beds before the comminuting arrangement (raw mill) can be of relatively small construction, or can be dispensed with altogether;

storage capacity of the storage zone is only determined by the necessary stock quantities or minimum stock quantities;

by greater homogeneity of the raw meal mixture a predetermined and constant quality of the product is achieved in a subsequent further processing arrangement, for example a specific and constant clinker quality and also a uniform burning operation in the production of cement clinker (and thus also a low energy consumption, less coating formation, longer kiln life);

by separation of the mixing and storage zones a relatively quick change of quality is possible.

We claim:

1. A method of preparing a mixture of materials from a plurality of mineral raw material components comprising the steps of:

individually proportioning said raw material components in predetermined quantities and delivering the proportioned components to a comminuting zone;

comminuting said proportioned raw material components to produce ground material;

homogenizing the ground material and delivering it to a processing device;

periodically extracting samples of the ground material at a sampling station upstream of the processing device and automatically analyzing such samples at said sampling station with regard to at least the chemical composition of the samples to ascertain actual measured value information; and feeding the actual measured value information to a computer and comparing such information to predetermined desired value information, whereupon in the event the actual measured value deviates from the desired value said computer operates a control system to correct proportioning of at least one of the raw material components fed toward the comminution device, wherein the homogenization of the ground material is carried out in a separate mixing zone having an outlet communicating with said processing device and a storage zone, said mixing zone receiving a quantity of the ground material equivalent to at least an hourly grinding capacity of said comminuting device and from which the homogenized material can be forwarded in controlled proportions to said processing device and said storage zone.

2. The method of claim 1 including analyzing the samples of ground material by X-ray fluorescence.

3. The method of claim 1 including feeding the actual measured value information to a laboratory computer.

4. The method of claim 1 wherein said sampling station is between the comminuting zone and the mixing zone and wherein the samples are delivered to a rapid analysis device located immediately in the proximity of said sampling station.

5. The method of claim 4 wherein the material sampling station is downstream of the mixing zone.

6. The method of claim 4 including taking at least four representative samples per hour and analyzing each of said samples with regard to oxides, lime standard, silica modulus, and alumina modulus.

7. The method of claim 6 wherein the delivery of the individual raw material components to the comminuting zone is individually proportioned by weight, and is adjusted directly by way of said computer at least for the purpose of correcting any deviation between the actual valve and the desired valve.

8. The method of claim 1 wherein the mixing zone has a receiving capacity corresponding to approximately the grinding capacity of the comminuting zone, and the storage zone has a storage capacity adapted to accommodate stock quantities which are at least dependent upon maximum possible shutdown times of the comminuting zone, the availability of said processing device, and a predetermined additional stock volume.

9. The method of claim 1 wherein in the preparation of a raw meal mixture for burning of cement clinker, the entire mass flow of raw material components from said comminuting zone is introduced directly into said mixing zone, an adjustable relatively larger quantity of the homogenized mass flow from said mixing zone is delivered to said processing device at which the homogenized mass is burned to form the cement clinker, and a relatively smaller adjustable part-quantity of such mass flow is delivered to said storage zone.

10. The method of claim 9 including delivering at least an adjustable proportion of the material from said storage zone to said mixing zone in such quantity that a predetermined storage quantity of the raw meal mixture always is maintained in said storage zone.

11. The method of claim 9 including delivering at least an adjustable portion of the material from said storage zone to said burning device in such quantity that a predetermined storage quantity of the raw meal mixture always is maintained in said storage zone.

12. The method of claim 9 including delivering at least an adjustable portion of the material from said storage zone to said mixing zone and said processing device in such quantity that a predetermined storage quantity of the raw meal mixture always is maintained in said storage zone.

13. The method of claim 10 wherein during operation of the comminuting device a part-quantity of about 10 to 30% of the material is conveyed from said mixing zone to said storage zone and an adjustable part-quantity of about 10 to 30% of said material is conveyed back from said storage zone to said mixing zone.

14. The method of claim 9 wherein during shutdown of the comminuting device, an adjustable main quantity of about 70 to 100% of the mass flow of raw material is passed through the mixing zone to the processing device for burning to form cement clinker, while any remaining quantity of such mass flow of raw material is passed directly to said processing device together with the quantity of said material coming from said mixing zone.

15. The method of claim 1 including introducing the entire mass flow of raw material from the comminuting zone directly into said mixing zone, and delivering at least an adjustable proportion of mixed material from said storage zone directly to said processing device.

16. Apparatus for preparing a material mixture from a plurality of mineral raw material components comprising:

a) a plurality of storage cells for accommodating the individual raw material components;

b) remote controlled proportioning devices disposed below said storage cells;

c) a mill for comminuting said components;

d) adjustable proportioning means for delivering a proportioned quantity of said components to said mill;

e) homogenizing means downstream of said mill for mixing the comminuted components;

f) a burning device downstream of said homogenizing means for burning the mixed components;

g) at least one material sampling station between said homogenizing means and said burning device for removing material samples;

h) at least one analysis device for analyzing the samples at least with regard to selected chemical compositions thereof and generating actual value information as to such chemical compositions;

i) a control device including a computer coupled to said analysis device and to said proportioning means operable in the event said actual value information determined by the analysis device deviates from a predetermined desired value to adjust at least one of said proportioning devices to enable said actual value to approach said predetermined value;

j) said analysis device being located on the spot of the material sampling station and being operable to perform automatic X-ray fluorescence analysis of the samples and to transmit said actual value information to said computer; and k) said homogenizing section being divided into a mixing zone and a storage zone and including an adjustable distribution device arranged downstream of said mixing zone, said adjustable distribution device being connected by a first conveying path to said burning device and being connected by a second conveying path to said storage zone, said storage zone communicating at least with said burning device via an adjustable proportioning device.

17. The apparatus of claim 16 wherein said mixing zone includes a mixing vessel having a receiving capacity of about one to three times that of the grinding capacity per unit of time of said mill, said storage zone including a continuous silo and having a storage capacity corresponding to a predetermined stock quantity which is determined at least in part by possible shutdown times of the mill and the rate of consumption of said mixed components by the burning device.

18. The apparatus of claim 16 wherein said mixing zone is disposed below said storage zone and said storage zone is connected by an adjustable proportioning device to said mixing zone and by a conveyor to said burning device.

19. The apparatus of claim 16 wherein said mixing zone is spaced from and alongside said storage zone, said storage zone having an outlet communicating only and directly with said burning device by means of said proportioning device and a conveyor.

20. The apparatus of claim 16 wherein said mixing zone is disposed above said storage zone, and including a first elevator provided between said mill and said mixing zone for supplying the mixing zone with material and a second elevator provided downstream of the mixing zone for supplying said burning device with material, and including a proportioning device communicating with said storage zone and with said first elevator for supplying said mixing zone with material.

* * * * *